(12) United States Patent
Shimoda et al.

(10) Patent No.: US 9,434,494 B2
(45) Date of Patent: Sep. 6, 2016

(54) BAG MAKING AND PACKAGING MACHINE

(71) Applicant: ISHIDA CO., LTD., Kyoto-shi, Kyoto (JP)

(72) Inventors: Takafumi Shimoda, Ritto (JP); Makoto Ichikawa, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 14/916,109

(22) PCT Filed: Aug. 11, 2014

(86) PCT No.: PCT/JP2014/071167
§ 371 (c)(1),
(2) Date: Mar. 2, 2016

(87) PCT Pub. No.: WO2015/040976
PCT Pub. Date: Mar. 26, 2015

(65) Prior Publication Data
US 2016/0194103 A1 Jul. 7, 2016

(30) Foreign Application Priority Data
Sep. 19, 2013 (JP) ................................. 2013-194527

(51) Int. Cl.
*B32B 37/00* (2006.01)
*B65B 51/30* (2006.01)
(Continued)

(52) U.S. Cl.
CPC ............... *B65B 51/30* (2013.01); *B29C 65/08* (2013.01); *B29C 66/4312* (2013.01); *B29C 66/849* (2013.01); *B65B 9/20* (2013.01); *B65B 51/225* (2013.01); *B65B 61/06* (2013.01); *B29L 2031/7128* (2013.01)

(58) Field of Classification Search
CPC ..... B65B 51/30; B65B 51/225; B65B 61/06; B29C 66/4312; B29C 66/849; B29C 65/08
USPC .......................... 156/515, 530, 580.1, 580.2
See application file for complete search history.

(56) References Cited

U.S. PATENT DOCUMENTS 6,482,291 B1 11/2002 Kume et al.
2005/0115665 A1* 6/2005 Saraf ................. A61F 13/15739
156/251

(Continued)

FOREIGN PATENT DOCUMENTS

JP 62-082914 U 5/1987
JP 2001-233309 A 8/2001

(Continued)

OTHER PUBLICATIONS

Translation of the Written Opinion of the International Searching Authority in connection with a corresponding International Application No. PCT/JP2014/071167, dated Mar. 22, 2016.

*Primary Examiner* — James Sells
(74) *Attorney, Agent, or Firm* — Global IP Counselors, LLP

(57) ABSTRACT

A bag making and packaging machine sandwiches a tubular film between a first horn and a first anvil and ultrasonically transversely seals it. The bag making and packaging machine includes: a knife disposed in an anvil-side knife movement space formed in the first anvil; a knife-driving part, and guides provided to each of two ends of the first anvil, on which guide spaces, by which movement of the knife is guided when the knife is driven by the air cylinder, are formed. The width of the guide spaces with respect to a direction orthogonal to both a length direction and a movement direction of the knife is less than the width of the anvil-side knife movement space with respect to the same direction.

6 Claims, 9 Drawing Sheets

(51) Int. Cl.
  *B65B 9/20* (2012.01)
  *B65B 51/22* (2006.01)
  *B65B 61/06* (2006.01)
  *B29C 65/08* (2006.01)
  *B29C 65/00* (2006.01)
  *B29L 31/00* (2006.01)

(56) References Cited

U.S. PATENT DOCUMENTS

2007/0251643 A1* 11/2007 Umebayashi ..... A61F 13/15739
  156/350
2008/0178560 A1* 7/2008 Capodieci ............. B29C 65/087
  53/479
2009/0049805 A1 2/2009 Specht et al.
2012/0090283 A1* 4/2012 Ippers .................... B26D 1/626
  53/548
2013/0228288 A1* 9/2013 Ippers .................. B26D 1/0006
  156/510

FOREIGN PATENT DOCUMENTS

| JP | 2003-341628 A | 12/2003 |
| JP | 2008-543688 A | 12/2008 |
| JP | 2012-236619 A | 12/2012 |

* cited by examiner

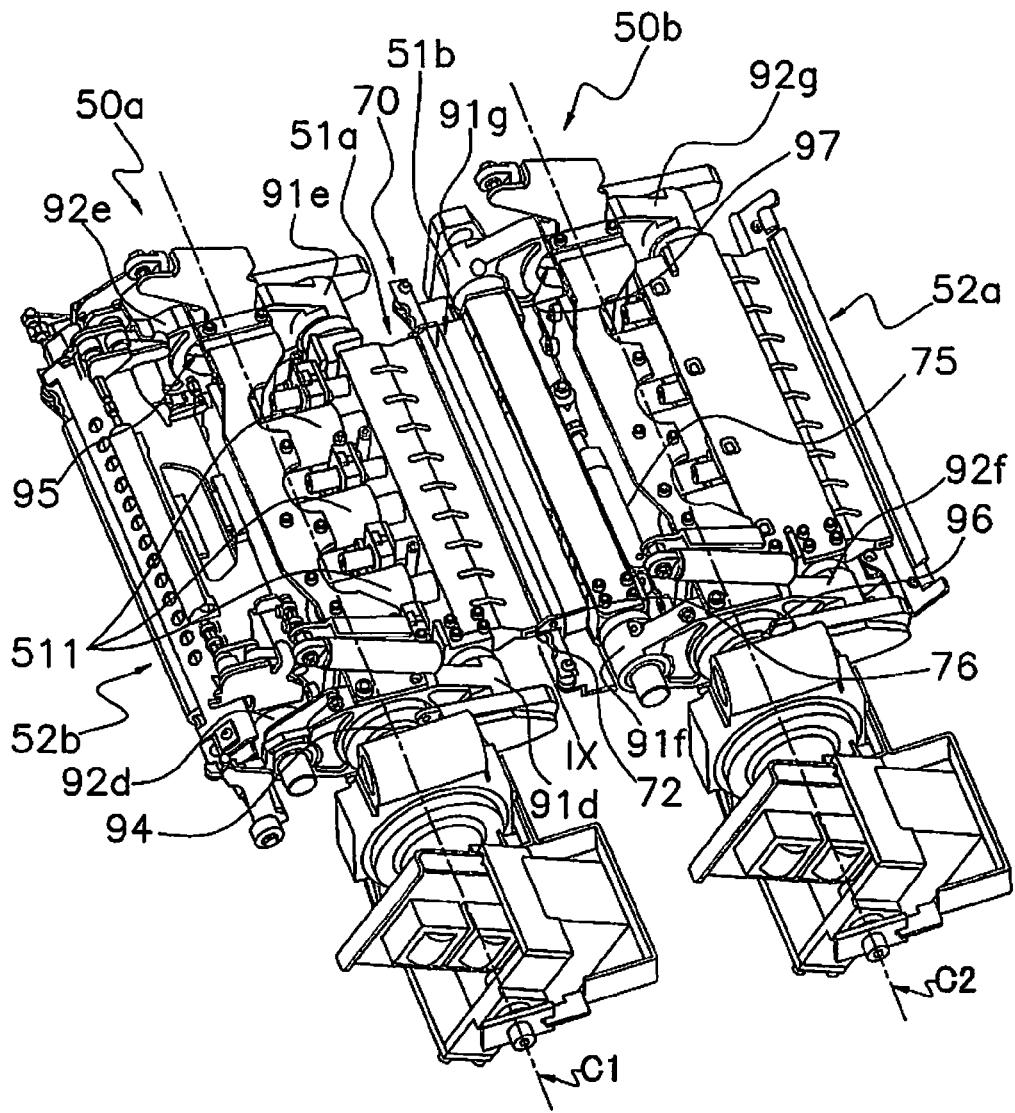
F I G. 5

(a)

(b)

BAG MAKING AND PACKAGING MACHINE

CROSS-REFERENCE TO RELATED APPLICATIONS

This U.S. National stage application of PCT/JP2014/071167 claims priority under 35 U.S.C. §119(a) to Japanese Patent Application No. 2013-194527, filed in Japan on Sept. 19, 2013, the entire contents of which are hereby incorporated herein by reference.

TECHNICAL FIELD

The present invention relates to a bag making and packaging machine, and in particular relates to a bag making and packaging machine for sandwiching a tubular film between a horn and an anvil and performing ultrasonic transverse sealing.

BACKGROUND ART

Conventionally, bag making and packaging machines for sandwiching a tubular film between a horn and an anvil and performing ultrasonic transverse sealing have been known (for example, Patent Document 1 (Japanese Laid-open Patent Application No. 2012-236619)).

In the bag making and packaging machine of Patent Document 1 (Japanese Laid-open Patent Application No. 2012-236619), a knife disposed inside a knife movement space formed in the anvil is moved toward the horn at the timing in which transverse sealing is performed using an ultrasonic unit, and a sealed bag is cut off from the tubular film.

SUMMARY OF THE INVENTION

Technical Problem

When the metal knife comes into contact with the anvil and/or the horn during ultrasonic transverse sealing, the quality of the transverse seal and/or the service life of the ultrasonic unit may be reduced. Therefore, in the bag making and packaging machine of Patent Document 1 (Japanese Laid-open Patent Application No. 2012-236619), it is necessary to adjust the attachment position of the knife with extraordinarily high accuracy so that the knife does not come into contact with the anvil or other members even if the knife should bend for any reason. Therefore, a great amount of effort is required when attaching the knife to the bag making and packaging machine during the maintenance or the like.

An object of the present invention is to provide a bag making and packaging machine for performing ultrasonic transverse sealing, wherein it is possible, when a knife disposed in a space formed in an anvil is moved toward a horn and a sealed bag is cut away from a tubular film, to prevent the knife from coming into contact with the anvil or other members and thereby to prevent reduction in the service life of an ultrasonic unit and other such circumstances from occurring.

Solution to Problem

A bag making and packaging machine according to the present invention is configured to sandwich a tube-shaped film transported in a first direction between a horn and an anvil for ultrasonic sealing and transversely seals it along a direction intersecting the first direction. The bag making and packaging machine is provided with a knife, a knife-driving part, and a guide part. The knife is disposed in a knife movement space formed in the anvil. The knife-driving part is configured to drive the knife disposed in the knife movement space such that the knife moves toward the horn when the film is transversely sealed so that a sealed bag is cut and separated from the tube-shaped film. The guide part is provided on each of both ends of the anvil. On the guide part, guide spaces, by which movement of the knife is guided when the knife is driven by the knife-driving part, are formed. The width of the guide spaces with respect to a second direction, which is orthogonal to both a movement direction of the knife driven by the knife-driving part and a length direction of the knife, is less than the width of the knife movement space with respect to the second direction.

According to the aspect described above, guide spaces for guiding the movement of the knife are formed in a guide provided on each of the both ends of the anvil, and the width of the guide spaces with respect to the second direction (a direction orthogonal to both the movement direction of the knife driven by the knife-driving part and the length direction of the knife) is less than the width of the knife movement space with respect to the same direction. Therefore, the knife comes into contact with the guide parts before coming into contact with the anvil or any other member, even if the knife should bend in the second direction for any reason. As a result, since the knife is prevented from coming into contact with the anvil or other members during transverse sealing, reduction in the service life of the ultrasonic unit and other such circumstances can be easily suppressed.

Preferably, in the bag making and packaging machine according to the present invention, the guide part is a non-metal member that is separate from the anvil.

According to the aspect described above, because the guide part is a non-metal member that is separate from the metal anvil, it is possible to suppress wear of the knife due to contact between the knife and the guide part.

Preferably, in the bag making and packaging machine according to the present invention, the guide part is secured to the anvil by a fastening member after the attaching position of the guide part to the anvil is adjusted.

According to the aspect described above, because the guide part is secured to the anvil, it is possible to adjust the attachment position of the guide part with respect to the anvil removed from the bag making and packaging machine. Therefore, the guide part is easily disposed in a suitable position with respect to the anvil.

Preferably, in the bag making and packaging machine according to the present invention, the horn and the anvil are respectively configured to be driven to revolve so that the tube-shaped film transported in the first direction is sandwiched and transversely sealed.

According to the aspect described above, by driving the horn and the anvil so as to revolve, it is possible to efficiently perform transverse sealing on the tube-shaped film. When the anvil is driven so as to revolve, the knife disposed in the knife movement space formed in the anvil readily bends due to the effects of rotary inertia. However, because the guide parts are provided, the knife is prevented from coming into contact with the anvil or other members. Therefore, it is possible to suppress a reduction in the service life of the ultrasonic unit and other such circumstances.

Preferably, in the bag making and packaging machine according to the present invention, the guide spaces extend further toward the horn side beyond the knife movement space in a state in which the horn and the anvil sandwich the tube-shaped film therebetween.

According to the aspect described above, even when the knife moves beyond the knife movement space formed in the anvil and moves through a space formed in the horn, the movement of the knife is readily guided by the guide spaces. Therefore, the knife is easily prevented from coming into contact with the horn, and it is easy to suppress a reduction in the service life of the ultrasonic unit and other such circumstances.

Preferably, in the bag making and packaging machine according to the present invention, a thickness of the knife is no more than 1.2 mm.

According to the aspect described above, by reducing the thickness of the knife to 1.2 mm or less, it is possible to utilize the film efficiently without waste. Reduction of the thickness of the knife allows the knife to readily bend, however, due to the presence of the guide part, the knife is prevented from coming into contact with the anvil or other members. As a result, the knife is prevented from coming into contact with the anvil or other members during transverse sealing, and a reduction in the service life of the ultrasonic unit and other such circumstances are easily prevented from occurring.

Advantageous Effects of Invention

In the bag making and packaging machine of the present embodiment, guide spaces for guiding the movement of the knife are formed in a guide provided on the both ends of the anvil, and the width of the guide spaces with respect to the second direction (a direction orthogonal to both the movement direction of the knife driven by the knife-driving part and the length direction of the knife) is less than the width of the knife movement space with respect to the same direction. Therefore, the knife comes into contact with the guide parts before coming into contact with the anvil or any other member, even if the knife should bend in the second direction for any reason. As a result, since the knife is prevented from coming into contact with the anvil or other members during transverse sealing, reduction in the service life of the ultrasonic unit and other such circumstances can be suppressed.

BRIEF DESCRIPTION OF THE DRAWINGS

FIG. 5 is a perspective view of a first rotating body and a second rotating body of the transverse sealing mechanism as in FIG. 3 (tubular film is not shown);

FIG. 9(a) is a side view showing the first horn and the first anvil to which the guides are attached, viewing from the direction of arrow IX, and FIG. 9(b) is a side view showing the first horn and the first anvil from which the guides are removed, viewing from the direction of arrow IX (tubular film not shown).

DESCRIPTION OF EMBODIMENTS

Figure 1:
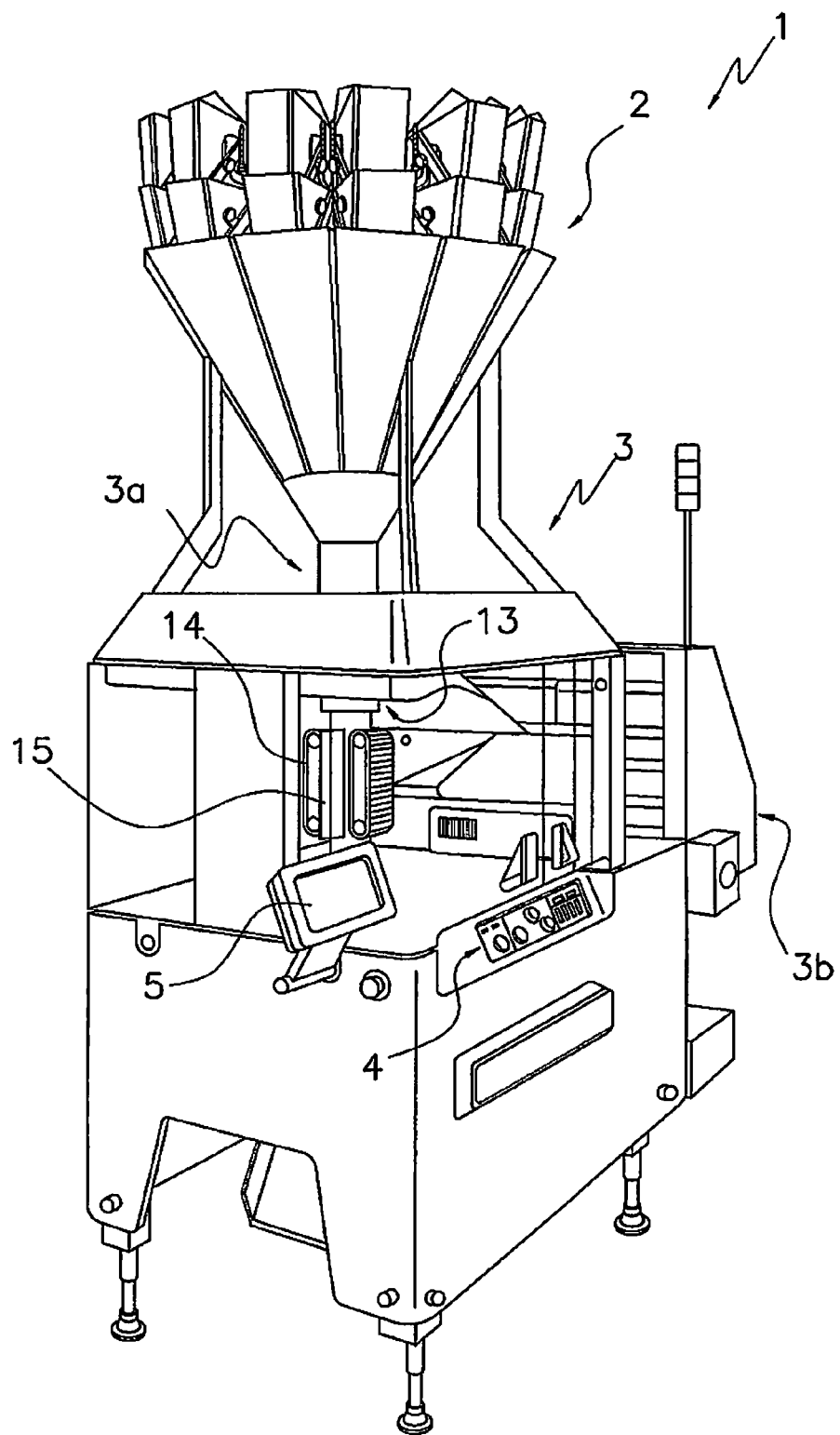
FIG. 1 is a perspective view of a weighing/packaging apparatus including a bag making and packaging machine according to one embodiment of the present invention.

An embodiment of the present invention is described below while referring to the drawings. The embodiment below is a specific example of the present invention, and is not given by way of any limitation on the technical scope thereof.

(1) Overall Configuration

Figure 2:
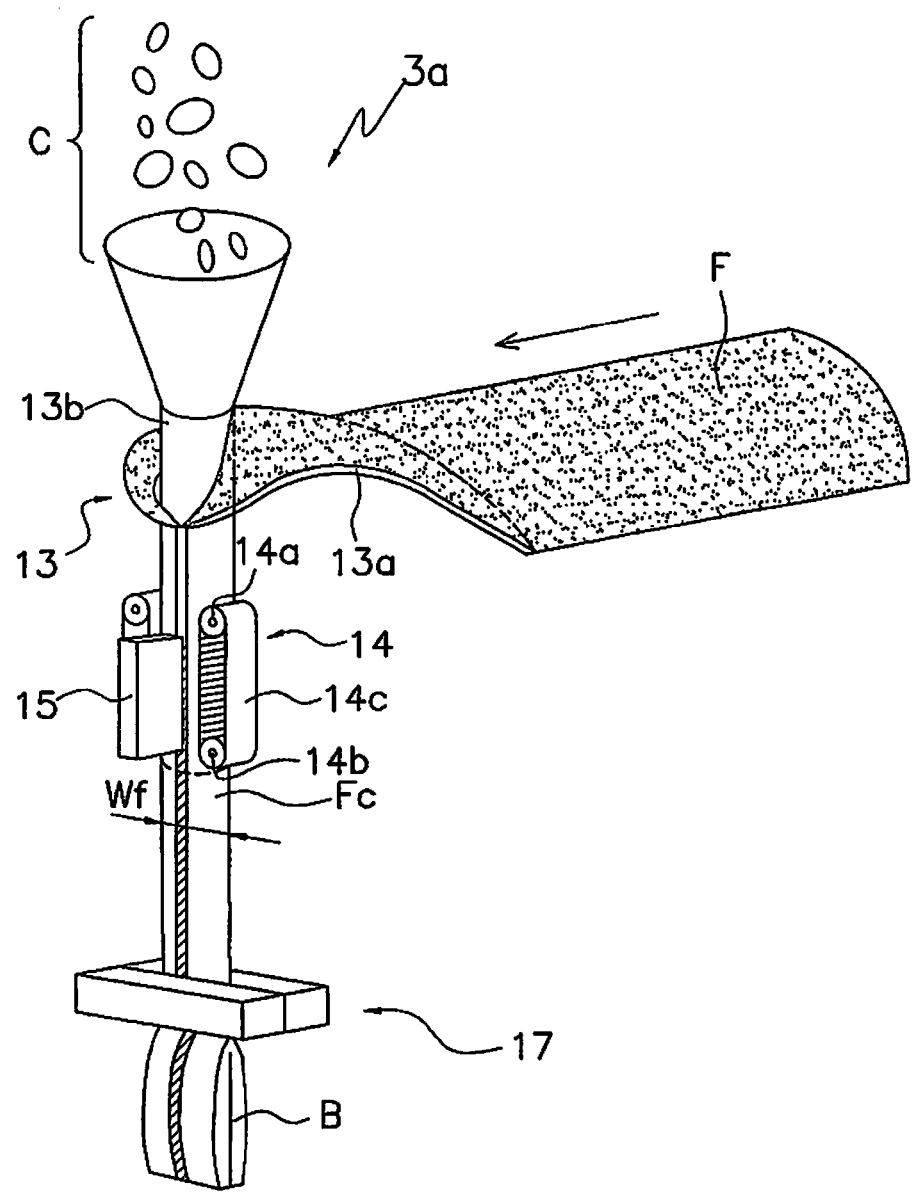
FIG. 2 is a perspective view schematically showing the configuration of a bag making and packaging unit of the bag making and packaging machine of FIG. 1.

FIG. 1 is a perspective view of a weighing/packaging apparatus 1 including a bag making and packaging machine 3 according to an embodiment of the present invention. FIG. 2 is a perspective view schematically showing the configuration of a weighing/packaging unit 3a included in the bag making and packaging machine 3.

The weighing/packaging apparatus 1 has a combination weighing machine 2 and a bag making and packaging machine 3. The bag making and packaging machine 3 comprises a weighing/packaging unit 3a and a film-supplying unit 3b.

The combination weighing machine 2 is disposed above the weighing/packaging unit 3a. In the combination weighing machine 2, the weight of articles C (packaged articles) is measured in a plurality of weighing hoppers, the articles C are combined such that the weight values thereof attain a prescribed total weight, and the combined articles C having a prescribed total weight are discharged downward.

The weighing/packaging unit 3a of the bag making and packaging machine 3 packs the articles C in the bag at the timing when the articles C are supplied from the combination weighing machine 2. The film-supplying unit 3b supplies a sealing film F to form a bag B to the weighing/packaging unit 3a.

The weighing/packaging apparatus 1 is provided with an operational switch 4 for operating the weighing/packaging apparatus 1. The weighing/packaging apparatus 1 also has a touch panel display 5 for displaying the state of operation of the weighing/packaging apparatus 1 and receiving various setting inputs and the like for the weighing/packaging apparatus 1. The operational switch 4 and the touch panel display 5 function as input units for receiving instructions to the combination weighing machine 2 and the bag making and packaging machine 3 and/or settings relating to the combination weighing machine 2 and the bag making and packaging machine 3. The touch panel display 5 also functions as an output unit for displaying information relating to the combination weighing machine 2 and the bag making and packaging machine 3. In the present embodiment, the operational switch 4 and the touch panel display 5 are shared by the combination weighing machine 2 and the bag making and packaging machine 3, but the present invention is not limited to this configuration; an operational switch and a touch panel display may be provided separately to each of these machines.

The operational switch 4 and/or the touch panel display 5 is connected to a control unit (not shown) configured from a CPU, a ROM, and a RAM, and other such components. The combination weighing machine 2 and the bag making and packaging machine 3 are controlled by the control unit (not shown) in accordance with the operations and settings inputted to the operational switch 4 and/or the touch panel display 5. The control unit takes required information from various different sensors (not shown) disposed on the combination weighing machine 2 and the bag making and packaging machine 3, and uses the information to control the combination weighing machine 2 and the bag making and packaging machine 3. In the present invention, the control unit controls both the combination weighing machine 2 and the bag making and packaging machine 3, but the present invention is not limited to this configuration; control units may be provided to each of the combination weighing machine 2 and the bag making and packaging machine 3.

(2) Specific Configuration

The bag making and packaging machine 3 will be described in detail.

In the description below, "forward (front)," "rearward (rear)", "up," "down," "left," "right," and other expressions may be used in order to indicate direction; in such cases, "forward (front)," "rearward (rear)", "up," "down," "left," and "right" are defined as in FIG. 2. When not otherwise specified, "forward (front)," "rearward (rear)," "up," "down," "left," "right," and other expressions are used in accordance with the definitions in FIG. 2. The expressions "upstream" and "downstream" may be used to refer to "upstream" and "downstream" in a direction of transport of the film F.

(2-1) Weighing/Packaging Unit

The weighing/packaging unit 3a will be described below.

The weighing/packaging unit 3a primarily has a forming mechanism 13, a pull-down belt mechanism 14, a longitudinal sealing mechanism 15, a transverse sealing mechanism 17, and a cutting mechanism 70 (refer to FIGS. 2 and 5).

The forming mechanism 13 forms a sheet-shaped film F transported from the film-supplying unit 3b into a tube shape. The pull-down belt mechanism 14 transports downward the film F shaped into a tube (referred to below as "tubular film Fc"). The longitudinal sealing mechanism 15 seals overlapping portions (seam) of the tubular film Fc in a longitudinal direction. The transverse sealing mechanism 17 seals the downwardly-transported tubular film Fc along a transverse direction, i.e., seals the downwardly-transported tubular film Fc along a direction intersecting the direction of transport, so that the top and bottom ends of the bag B are sealed. The cutting mechanism 70 cuts the tubular film Fc in order to cut away the transversely sealed bag B from the tubular film Fc.

(2-1-1) Forming Mechanism

The forming mechanism 13 has a tube 13b and a former 13a.

The tube 13b is a tubular member and is open on the top and bottom ends. Articles C weighed by the combination weighing machine 2, are introduced into the opening in the top end of the tube 13b.

The former 13a is disposed so as to surround the tube 13b. A sheet-shaped film F sent out from a film roll of the film-supplying unit 3b is formed into a tubular shape when passing between the former 13a and the tube 13b. The tube 13b and the former 13a of the forming mechanism 13 can be replaced depending on the size of the bag B to be manufactured.

(2-1-2) Pull-Down Belt Mechanism

The pull-down belt mechanism 14 sucks tubular film Fc wrapped on the tube 13b and continuously transports it downward. The pull-down belt mechanism 14 has a pair of belts 14c disposed respectively on the left and right sides of the tube 13b, as shown in FIG. 2. In the pull-down belt mechanism 14, the belts 14c having a sucking function are rotated with a drive roller 14a and a driven roller 14b so that the tubular film Fc is transported downwardly. In FIG. 2, an illustration of a roller drive motor rotating the drive roller 14a and the like is omitted.

(2-1-3) Longitudinal Sealing Mechanism

The longitudinal sealing mechanism 15 ultrasonically seals the tubular film Fc in the longitudinal direction (a vertical direction in FIG. 2).

The longitudinal sealing mechanism 15 is disposed on the front side of the tube 13b (refer to FIG. 2). The longitudinal sealing mechanism 15 is driven forward and backward by a drive mechanism (not shown) so as to approach the tube 13b or so as to retract from the tube 13b. When the longitudinal sealing mechanism 15 is driven so as to approach the tube 13b by the drive mechanism, the overlapping portion (seam) of the tubular film Fc wrapped on the tube 13b is sandwiched between the longitudinal sealing mechanism 15 and the tube 13b. The longitudinal sealing mechanism 15 ultrasonically seals the tubular film Fc in the longitudinal direction while the longitudinal sealing mechanism 15 is pressed against the tube 13b with a constant pressure by the drive mechanism (while the overlapping portion of the tubular film Fc is sandwiched between the longitudinal sealing mechanism 15 and the tube 13b).

(2-1-4) Transverse Sealing Mechanism

The transverse sealing mechanism 17 performs ultrasonic sealing in a state where the tubular film Fc is sandwiched by a first horn 51a and a first anvil 51b, to be described later, or between a second horn 52a and a second anvil 52b. The transverse sealing mechanism 17 is one example of an ultrasonic sealing mechanism for transversely sealing the downward-transported tubular film Fc along a direction intersecting the transportation direction of the tubular film Fc.

Figure 3:
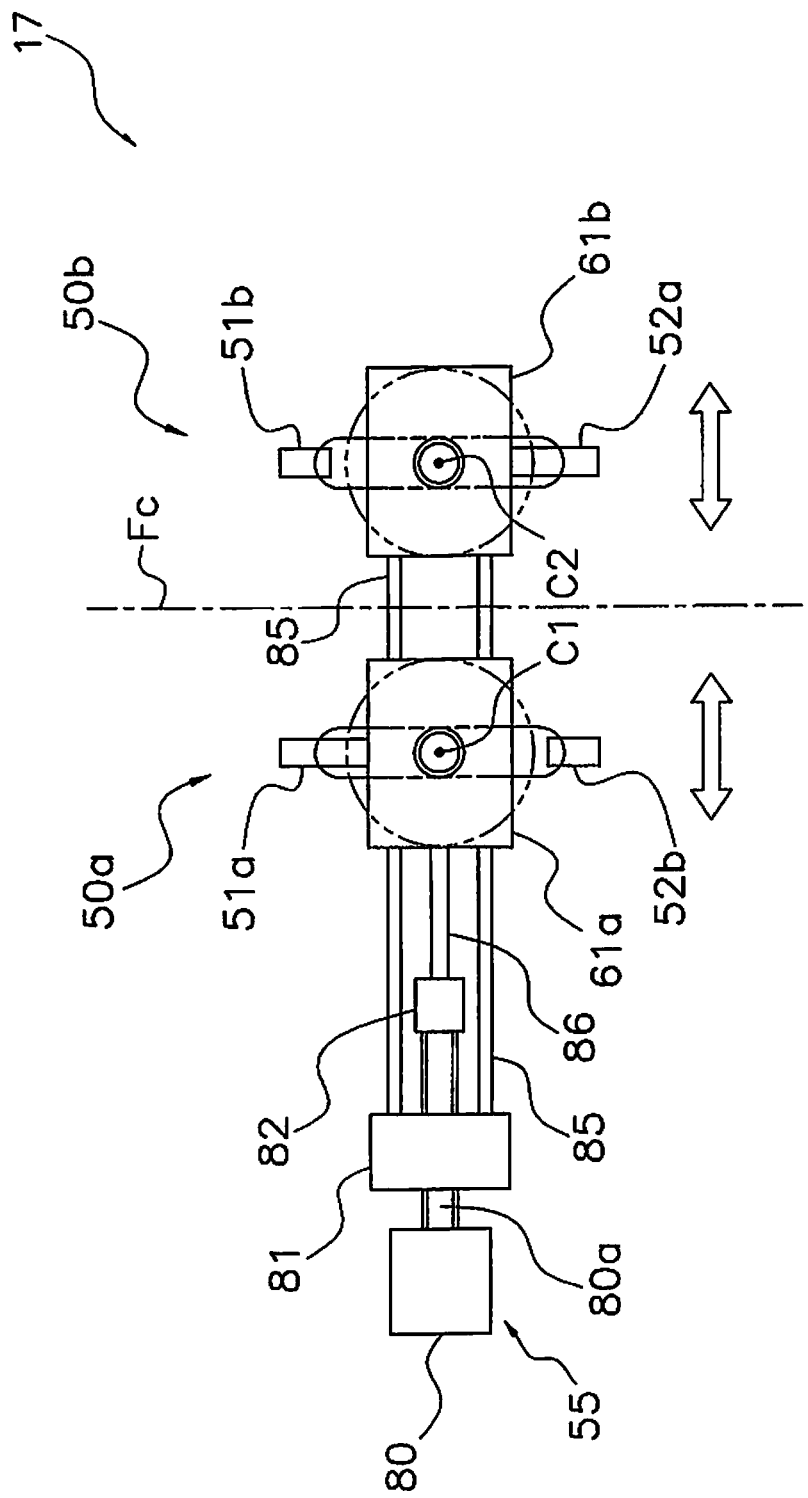
FIG. 3 is a schematic side view showing a transverse sealing mechanism of the bag making and packaging unit of FIG. 2, viewing from the left side in FIG. 2.
Figure 4:
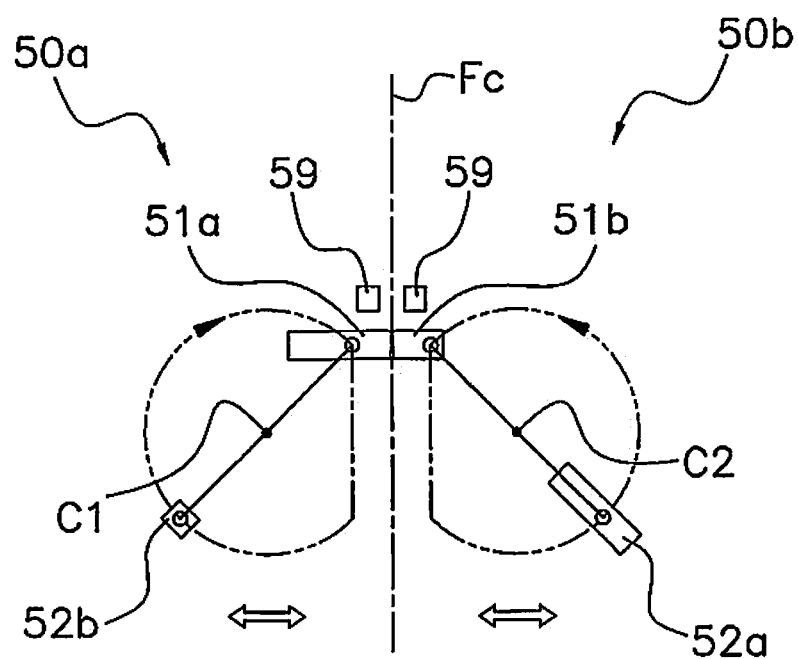
FIG. 4 is a side view showing trajectories of a horn and an anvil of the transverse sealing mechanism of FIG. 3, viewing from the left side in FIG. 2.

The transverse sealing mechanism 17 primarily has a first rotating body 50a, a second rotating body 50b, and a horizontal-direction drive mechanism 55, as shown in FIGS. 3 and 4. The first rotating body 50a is arranged on the rear side (left side in FIGS. 3 and 4) of the tubular film Fc. The second rotating body 50b is arranged on the front side (right side in FIGS. 3 and 4) of the tubular film Fc. The horizontal-direction drive mechanism 55 moves the first rotating body 50a and the second rotating body 50b horizontally (refer to the arrows in FIGS. 3 and 4) forward and backward (along a left-right direction in FIGS. 3 and 4) so as to approach each other or separate from each other.

A first horn 51a and a second anvil 52b for ultrasonic sealing are attached to the first rotating body 50a (refer to FIGS. 3 and 4). The second anvil 52b is disposed at a position set apart from the first horn 51a by 180° about the axis of rotation of the first rotating body 50a. A first anvil 51b and a second horn 52a for ultrasonic sealing are attached to the second rotating body 50b (refer to FIGS. 3 and 4). The second horn 52a is disposed at a position set apart from the first anvil 51b by 180° about the axis of rotation of the second rotating body 50b. As will be described later, the first rotating body 50a and the second rotating body 50b are rotated about the respective axes of rotation and rotate together, synchronized with respect to one another, whereby the tubular film Fc is sandwiched alternatingly between the first horn 51*a* and the first anvil 51*b* or between the second horn 52*a* and the second anvil 52*b* and transversely sealed.

The first rotating body 50*a* and the second rotating body 50*b* will be described in detail.

The first rotating body 50*a* includes revolving shafts 94, 95, levers 91*d*, 92*d* rotatably supported by the revolving shaft 94, and levers 91*e*, 92*e* rotatably supported by the revolving shaft 95, as shown in FIG. 5. The revolving shaft 94 is secured to a first horizontal-movement plate 61*a* disposed on the left side of the first rotating body 50*a*, to be described later. The revolving shaft 95 is secured to a first horizontal-movement plate 61*a* disposed on the right side of the first rotating body 50*a*, to be described later. A left-side end part of the first horn 51*a* is secured to an end part of the lever 91*d* supported by the revolving shaft 94. A right-side end part of the first horn 51*a* is secured to an end part of the lever 91*e* supported by the revolving shaft 95. A left-side end part of the second anvil 52*b* is secured to an end part of the lever 92*d* supported by the revolving shaft 94. A right-side end part of the second anvil 52*b* is secured to an end part of the lever 92*e* supported by the revolving shaft 95.

The second rotating body 50*b* includes revolving shafts 96, 97, levers 91*f*, 92*f* rotatably supported by the revolving shaft 96, and levers 91*g*, 92*g* rotatably supported by the revolving shaft 97, as shown in FIG. 5. The revolving shaft 96 is secured to a second horizontal-movement plate 61*b* disposed on the left side of the second rotating body 50*b*, to be described later. The revolving shaft 97 is secured to a second horizontal-movement plate 61*b* disposed on the right side of the second rotating body 50*b*, to be described later. A left-side end part of the first anvil 51*b* is secured to an end part of the lever 91*f* supported by the revolving shaft 96. A right-side end part of the first anvil 51*b* is secured to an end part of the lever 91*g* supported by the revolving shaft 97. A left-side end part of the second horn 52*a* is secured to an end part of the lever 92*f* supported by the revolving shaft 96. A right-side end part of the second horn 52*a* is secured to an end part of the lever 92*g* supported by the revolving shaft 97.

The first rotating body 50*a* and the second rotating body 50*b* are driven by a drive motor (not shown) so as to rotate about axes of rotation that extend along a transverse-seal direction (the left-right direction). In other words, the first rotating body 50*a* and the second rotating body 50*b* are driven by the drive motor so as to respectively rotate about centers of rotation C1, C2 as viewed from the side (refer to FIG. 4). This causes the first horn 51*a* and the second anvil 52*b* to rotate about the center of rotation C1, and the first anvil 51*b* and the second horn 52*a* to rotate about the center of rotation C2 (refer to FIG. 4). The first rotating body 50*a* rotates clockwise about the center of rotation C1 when viewed from the left side as shown in FIG. 4. In other words, the first horn 51*a* and the second anvil 52*b* rotate clockwise about the center of rotation C1 when viewed from the left side as shown in FIG. 4. The second rotating body 50*b* rotates counterclockwise about the center of rotation C2 when viewed from the left side as shown in FIG. 4. In other words, the first anvil 51*b* and the second horn 52*a* rotate counterclockwise about the center of rotation C2 when viewed from the left side as shown in FIG. 4.

The first rotating body 50*a* and the second rotating body 50*b* are driven forward and backward by the horizontal-direction drive mechanism 55, as described below.

Both ends of the first rotating body 50*a* with respect to the transverse-seal direction (the left-right direction) are supported by the first horizontal-movement plate 61*a* (refer to FIG. 3). More specifically, the revolving shafts 94, 95 of the first rotating body 50*a* are supported by the first horizontal-movement plate 61*a*. Both ends of the second rotating body 50*b* with respect to the transverse-seal direction (the left-right direction) are supported by the second horizontal-movement plate 61*b* (refer to FIG. 3). More specifically, the revolving shafts 96, 97 of the second rotating body 50*b* are supported by the second horizontal-movement plate 61*b*. The first horizontal-movement plate 61*a* and the second horizontal-movement plate 61*b* are driven by the horizontal-direction drive mechanism 55 so as to approach or separate from each other as viewed from the side (refer to the arrows in FIG. 3).

The horizontal-direction drive mechanism 55 will be described in detail.

The horizontal-direction drive mechanism 55 has a servo motor 80, a ball screw 80*a*, a first nut 81, a second nut 82, a first linking rod 85, and a second linking rod 86.

The ball screw 80*a* is driven by the servo motor 80 (refer to FIG. 3) so as to rotate. The first nut 81 and the second nut 82 are screwed with the ball screw 80*a*. The ball screw 80*a* is configured such that the portion with which the first nut 81 is screwed and the portion with which the second nut 82 is screwed have mutually opposite threads. The first linking rod 85 connects the first nut 81 and the second horizontal-movement plate 61*b*. FIG. 3 shows only a side view as viewed from the left side, but the second horizontal-movement plate 61*b* (not shown) disposed on the right side is connected to the first nut 81 by the first linking rod 85 as well. The first linking rod 85 is not connected to the first horizontal-movement plate 61*a*, but slidably extends through the first horizontal-movement plate 61*a*. The first linking rod 85 is provided so as to extend along a movement direction of the first horizontal-movement plate 61*a* and the second horizontal-movement plate 61*b* (along a front-rear direction in FIG. 2). The second linking rod 86 connects the second nut 82 and the first horizontal-movement plate 61*a*. FIG. 3 shows only a side view as viewed from the left side, but the first horizontal-movement plate 61*a* (not shown) disposed on the right side is connected to the second nut 82 by the second linking rod 86 as well. The second linking rod 86 is also provided so as to extend along the movement direction of the first horizontal-movement plate 61*a* and the second horizontal-movement plate 61*b* (along the front-rear direction in FIG. 2).

When the ball screw 80*a* is rotated by the servo motor 80, the first horizontal-movement plate 61*a* and the second horizontal-movement plate 61*b* move horizontally so as to approach and separate from each other as viewed from the side (refer to the arrows in FIG. 3).

The horizontal movement of the first rotating body 50*a* and the second rotating body 50*b* by the horizontal-direction drive mechanism 55 and the rotation of the first rotating body 50*a* and the second rotating body 50*b* are combined, and the first horn 51*a*, the second anvil 52*b*, the first anvil 51*b*, and the second horn 52*a* are driven so as to revolve on D-shaped tracks as viewed from the side (refer to the trajectories of the horn and anvil indicated by chain double-dashed lines in FIG. 4; and also refer to the arrows shown on the chain double-dashed lines for the direction of revolution). The paired horn and anvil, i.e., the first horn 51*a* and the first anvil 51*b*, or the second horn 52*a* and the second anvil 52*b*, sandwich the downward-transported tubular film Fc, and transversely seal it along a direction intersecting the transport direction of the tubular film Fc. The first horn 51*a* and the first anvil 51*b*, or the second horn 52*a* and the second anvil 52*b*, perform rotational motion until they begin to sandwich the tubular film Fc, perform linear motion along the vertical direction from when they begin to sandwich the tubular film Fc until they finish sandwiching it, and perform rotational motion again after they finish sandwiching the tubular film Fc. Ultrasonic transverse sealing is performed while the first horn 51a and the first anvil 51b, or the second horn 52a and the second anvil 52b, move linearly along the vertical direction while sandwiching the tubular film Fc with a prescribed pressure from the front side and the rear side.

As shown in FIG. 4, a film detection sensor 59 is disposed at a prescribed position above the transverse sealing mechanism 17 (slightly above the position at which the first horn 51a and the first anvil 51b, or the second horn 52a and the second anvil 52b, of the transverse sealing mechanism 17 begin to sandwich the tubular film Fc). For example, a photoelectric sensor and/or an ultrasonic sensor is applied as the film detection sensor 59.

The film detection sensor 59 confirms whether a tubular film Fc is present or not immediately before the commencement of transverse sealing by the first horn 51a and the first anvil 51b, or by the second horn 52a and the second anvil 52b. In a case where it is determined, based on a signal from the film detection sensor 59, that no tubular film Fc is present, the first horn 51a and the first anvil 51b, or the second horn 52a and the second anvil 52b, performs revolving motion while maintaining a gap between the horns 51a, 52a and the anvils 51b, 52b so as not to perform the transverse sealing operation. This makes it possible to prevent that the first horn 51a and the first anvil 51b, or the second horn 52a and the second anvil 52b directly contact with each other and thereby they are damaged.

(2-1-4-1) Horn

The first and second horns 51a, 52a will be described in detail.

The first horn 51a is provided to the first rotating body 50a, and the second horn 52a is provided to the second rotating body 50b. The first horn 51a paired with the first anvil 51b provided to the second rotating body 50b transversely seals the tubular film Fc, and the second horn 52a paired with the second anvil 52b provided to the first rotating body 50a transversely seals the tubular film Fc. Aside from these features, the first horn 51a and the second horn 52a have the same structure and function; therefore, the first horn 51a will be described here but description pertaining to the second horn 52a will be omitted.

The first horn 51a and the first anvil 51b function as a pair so that ultrasonic transverse sealing is performed on the tubular film Fc, which is sandwiched between the first horn 51a and the first anvil 51b, along a direction (in the present embodiment, the left-right direction) intersecting the transport direction (in the present embodiment, downward) of the tubular film Fc. The first horn 51a is manufactured, for example, by machining stainless steel or another metal.

In the bag making and packaging machine 3 according to the present embodiment, as described later, anvil components 51b1, 51b2, . . . 51bn used as the first anvil 51b are replaced in accordance with the size of the bag B for sealing the articles C; in other words, the width Wf (refer to FIG. 2) of the tubular film Fc with respect to the transverse-seal direction (the left-right direction). However, the first horn 51a is the same irrespective of the width Wf of the tubular film Fc with respect to the transverse-seal direction. That is, the first horn 51a is not replaced depending on the width Wf of the tubular film Fc with respect to the transverse-seal direction. In other words, the first horn 51a is common irrespective of which of the anvil components 51b1, 51b2, . . . 51bn is used as the first anvil 51b. By using the common first horn 51a irrespective of which of the anvil components 51b1, 51b2, . . . 51bn is used as the first anvil 51b, it is possible to reduce the costs (in particular, the manufacturing costs of the horn and the components of the horn) of the bag making and packaging machine 3.

The width Wh, with respect to the transverse-seal direction (the left-right direction), of a seal surface 512a (refer to FIG. 6) of the first horn 51a which faces the first anvil 51b during transverse sealing is designed to be greater than the maximum value of the width Wf of the tubular film Fc that can be used in the present bag making and packaging machine 3, so that the width Wh of the seal surface 512a can accommodate differences in the width Wf of the tubular film Fc.

Figure 6:
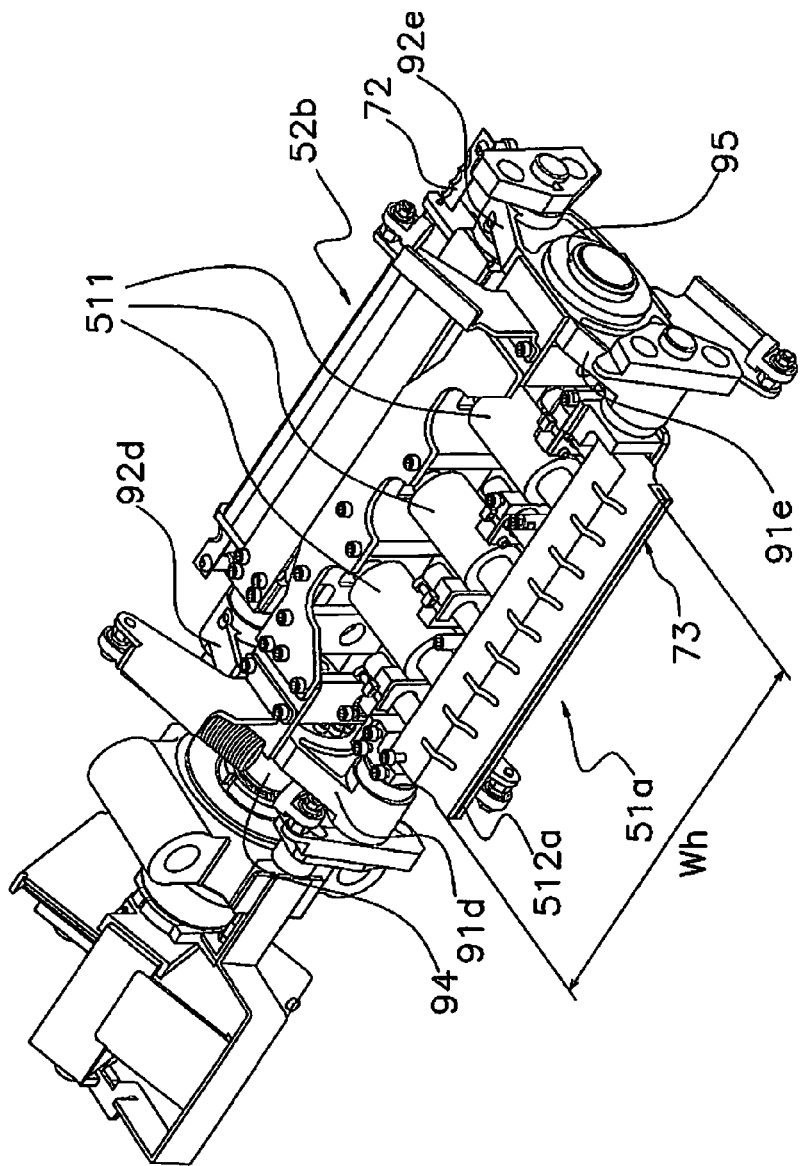
FIG. 6 is a perspective view of the first rotating body of the transverse sealing mechanism of FIG. 3.

A slot 73 that opens on the seal surface 512a is formed in the first horn 51a, as shown in FIG. 6. The slot 73 is formed so as to extend along the transverse-seal direction (the left-right direction). The slot 73 forms a horn-side knife movement space Sh through which, when the sealed bag B is cut away from the tubular film Fc by a knife 72 of the cutting mechanism 70 disposed in an anvil-side knife movement space Sa in the first anvil 51b, the knife 72 moves. The slot 73 and the horn-side knife movement space Sh will be described later.

Three oscillators 511, as vibration-generating devices, are linked to the first horn 51a so as to be aligned along the transverse-seal direction at equally spaced intervals (refer to FIG. 6). By vibrating the three oscillators 511, the portion of the tubular film Fc that is sandwiched by the seal surface 512a of the first horn 51a and a seal surface 512b of the first anvil 51b is welded. The above number of oscillators 511 is given as an example, but the present invention is not limited to this configuration. A suitable number of oscillators 511 may be disposed in accordance with the dimensions of the first horn 51a.

(2-1-4-2) Anvil

The first and second anvils 51b, 52b will be described in detail.

The first anvil 51b is provided to the second rotating body 50b, and the second anvil 52b is provided to the first rotating body 50a. The first anvil 51b paired with the first horn 51a provided to the first rotating body 50a transversely seals the tubular film Fc, and the second anvil 52b paired with the second horn 52a provided to the second rotating body 50b transversely seals the tubular film Fc. Aside from these features, the first anvil 51b and the second anvil 52b have the same structure and function; therefore, the first anvil 51b will be described here but description pertaining to the second anvil 52b will be omitted.

The first anvil 51b and the first horn 51a function as a pair so that ultrasonic transverse sealing is performed on the tubular film Fc, which is sandwiched between the first horn 51a and the first anvil 51b, along a direction (in the present embodiment, the left-right direction) intersecting the transport direction (in the present embodiment, downward) of the tubular film Fc. The first anvil 51b is manufactured, for example, by machining stainless steel or another metal.

The transverse sealing mechanism 17 has, as the first anvil 51b, a plurality of anvil components 51b1, 51b2, . . . 51bn prepared in accordance with the side of the bag B for sealing the articles C; in other words, the width Wf (refer to FIG. 2) of the tubular film Fc.

When the anvil components 51b1, 51b2, . . . 51bn are used together with the first horn 51a to transversely seal the tubular film Fc, the widths of distal-end contact parts of the anvil components 51b1, 51b2, . . . 51bn that sandwich the tubular film Fc together with the first horn 51a are respectively different. In other words, the anvil components 51b1, 51b2, . . . 51bn have widths Wa of seal surfaces 512b (refer to FIG. 7) with respect to the transverse-seal direction (the left-right direction) which is different for each of the components. The seal surfaces 512b sandwiches the tubular film Fc together with the seal surface 512a of the first horn 51a when the anvil components 51b1, 51b2, . . . 51bn are used together with the first horn 51a to transversely seal the tubular film Fc. When the bag making and packaging machine 3 is operated in a state one of the anvil components 51b1, 51b2, . . . 51bn is attached to the second rotating body 50b as the first anvil 51b, the tubular film Fc is sandwiched between the seal surface 512a of the first horn 51a and the seal surface 512b of the first anvil 51b, and ultrasonic transverse sealing is then undergone on the tubular film Fc along a width direction of the seal surface 512a and the seal surface 512b.

Although the seal-direction width Wa of the seal surface 512b of each of the anvil components 51b1, 51b2, . . . 51bn differs from that of the other anvil components 51b1, 51b2, . . . 51bn, the width of the portion that faces the first horn 51a during transverse sealing; i.e., the total width Wt (refer to FIG. 7) of the anvil components 51b1, 51b2, . . . 51bn with respect to the left-right direction, is the same as that of the other anvil components 51b1, 51b2, . . . 51bn. In other words, the seal-direction width Wa of the seal surface 512b of the anvil components 51b1, 51b2, . . . 51bn is different for each of the components, but the total width Wt of the anvil components 51b1, 51b2, . . . 51bn with respect to the left-right direction is consistently the same. Because the total width Wt is the same, it is easy to tightly secure the anvil components 51b1, 51b2, . . . 51bn to the second rotating body 50b, even when the width Wa of the seal surface 512b is relatively small.

The seal surface 512b of the anvil components 51b1, 51b2, . . . 51bn is disposed at the center of the anvil components 51b1, 51b2, . . . 51bn with respect to the transverse-seal direction (the left-right direction). In the anvil components 51b1, 51b2, . . . 51bn, among the portions that face the first horn 51a when the anvil components 51b1, 51b2, . . . 51bn are used as the first anvil 51b to transversely seal the tubular film Fc together with the first horn 51a, portions adjacent to the seal surface 512b (distal-end contact part) on both sides with respect to the width direction (the left-right direction) thereof are cut off so as to keep a distance from the first horn 51a during transverse sealing. In other words, in the anvil components 51b1, 51b2, . . . 51bn, among the portions of the anvil components 51b1, 51b2, . . . 51bn that face the first horn 51a when the anvil components 51b1, 51b2, . . . 51bn are used as the first anvil 51b to transversely seal the tubular film Fc together with the first horn 51a, both end portions in the width direction (the left-right direction) are cut off and adjacent surfaces 513b are thereby formed, and a portion that is not cut off remains as the seal surface 512b. When the anvil components 51b1, 51b2, . . . 51bn are used as the first anvil 51b to transversely seal the tubular film Fc together with the first horn 51a, the seal surface 512a of the first horn 51a and the seal surface 512b of the first anvil 51b come into contact with the tubular film Fc interposed therebetween, whereas the seal surface 512a of the first horn 51a and the adjacent surfaces 513b are set apart from each other by a prescribed distance (e.g., 1.5 mm) (refer to FIG. 9(b)).

When the bag making and packaging machine 3 is started to use, and/or when the width Wf of the tubular film Fc being used is changed, the anvil component 51b1, 51b2, . . . 51bn in which the width Wa of the seal surface 512b is greater than and as close as possible to the width Wf of the tubular film Fc is selected as the first anvil 51b and attached to the second rotating body 50b. Using one of the anvil components 51b1, 51b2, . . . 51bn having different widths Wa of the seal surfaces 512b in accordance with the width Wf of the tubular film Fc makes it possible to reduce the likelihood that the first horn 51a and the first anvil 51b will come into contact with each other, to a greater extent than when the width Wa of the seal surface 512b is fixed irrespective of the width Wf of the tubular film Fc. The anvil components 51b1, 51b2, . . . 51bn may be prepared individually for each width Wf of the tubular film Fc being used, or may be prepared for individual ranges of widths Wf of the tubular film Fc being used. For example, the anvil component 51b1 is used when the width of the tubular film Fc is within the range of 200-220 mm, and the anvil component 51b2 is used when the width of the tubular film Fc is within the range of 220-240 mm. If the anvil components 51b1, 51b2, . . . 51bn are prepared for respective widths Wf of the tubular film Fc being used, it is easier to reduce the likelihood that the first horn 51a and the first anvil 51b will come into contact with each other. However, when the anvil components 51b1, 51b2, . . . 51bn are prepared for individual ranges of widths Wf of the tubular film Fc being used, manufacturing costs can be reduced to a greater extent than when the anvil components 51b1, 51b2, . . . 51bn are prepared for respective widths Wf of the tubular film Fc.

Figure 7:
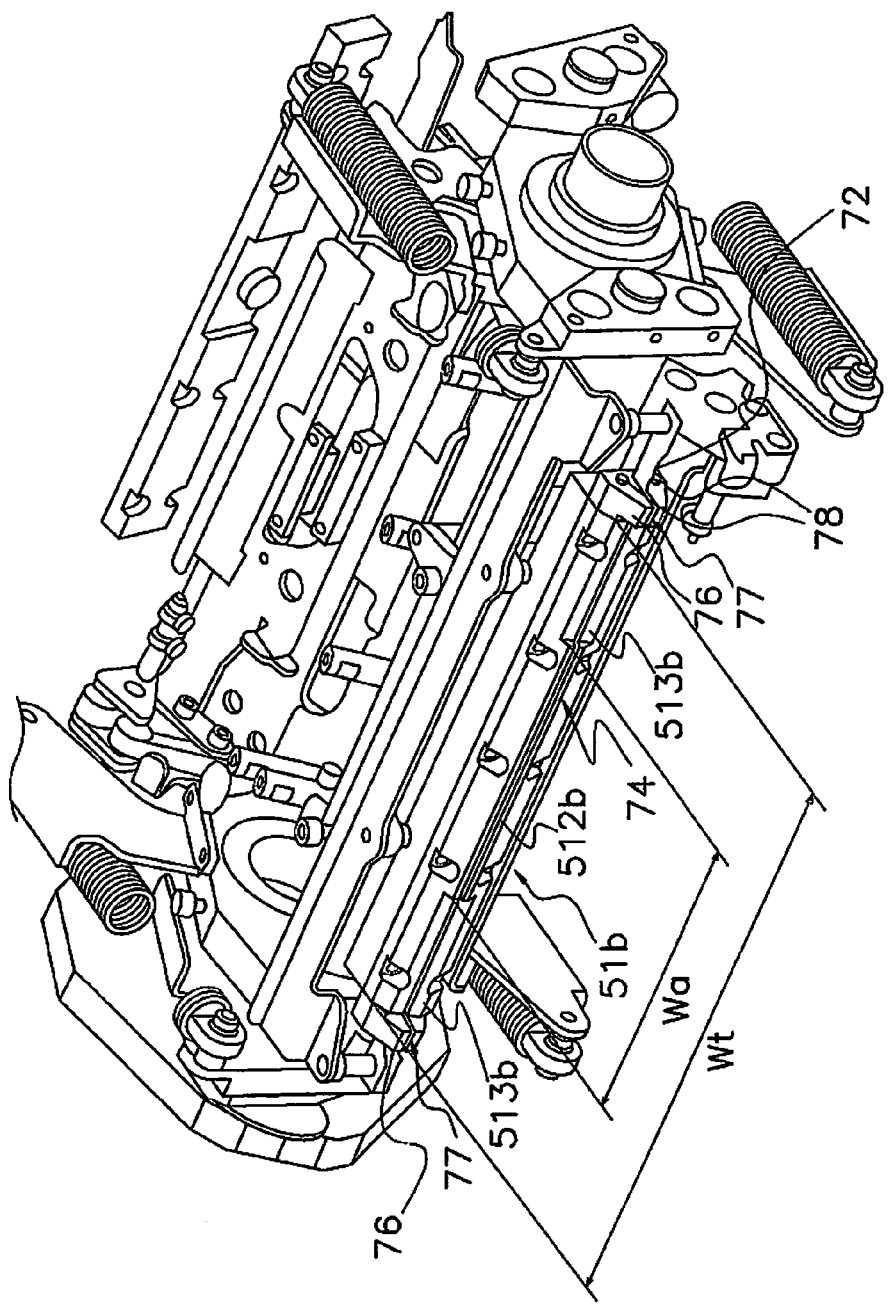
FIG. 7 is a perspective view of a first anvil attached to the second rotating body of the transverse sealing mechanism of FIG. 3, and the periphery of the first anvil.

A slot 74 is formed in the first anvil 51b (i.e., the anvil components 51b1, 51b2, . . . 51bn), the slot 74 opening at a side of the first anvil 51b that faces the first horn 51a when the first anvil 51b is used together with the first horn 51a to transversely seal the tubular film Fc (refer to FIG. 7). The slot 74 is formed so as to extend along the transverse-seal direction (the left-right direction). The slot 74 forms an anvil-side knife movement space Sa in which the knife 72 of the cutting mechanism 70, as will be described later, is disposed. During transverse sealing of the tubular film Fc, the knife 72 disposed in the anvil-side knife movement space Sa is driven so as to move toward the first horn 51a, and furthermore to move within the horn-side knife movement space Sh formed in the first horn 51a. As a result, the sealed bag B is cut away from the upstream-side tubular film Fc by the knife 72. The slot 74 and the anvil-side knife movement space Sa will be described later.

A guide 76 is provided, as a separate member, to each of the two ends of the first anvil 51b with respect to the transverse-seal direction (both left-right-direction ends). The guides 76 are members that configure the cutting mechanism 70, as will be described later. The guides 76 are non-metal members (e.g., resin members). The attachment positions of the guides 76 are adjusted with respect to the first anvil 51b (the anvil components 51b1, 51b2, . . . 51bn) in a state in which the first anvil 51b is removed from the second rotating body 50b. The guides 76, in which the attachment positions are adjusted with respect to the first anvil 51b, are secured to the first anvil 51b (the anvil components 51b1, 51b2, . . . 51bn) by bolts 78 used as fastening members.

Guide slots 77 that open toward the same direction as does the slot 74 of the first anvil 51b are formed in the guides 76. In other words, the guide slots 77 open on the side on which the first rotating body 50a, to which the first horn 51a is attached, is disposed when the first anvil 51b is used to transversely seal the tubular film Fc together with the first horn 51a. The guide slots 77 form guide spaces Sg for guiding the movement of the knife 72 of the cutting mechanism 70 when the knife 72 is driven by an air cylinder 75 in order to cut away the bag B from the tubular film Fc, as will be described later.

Figure 8:
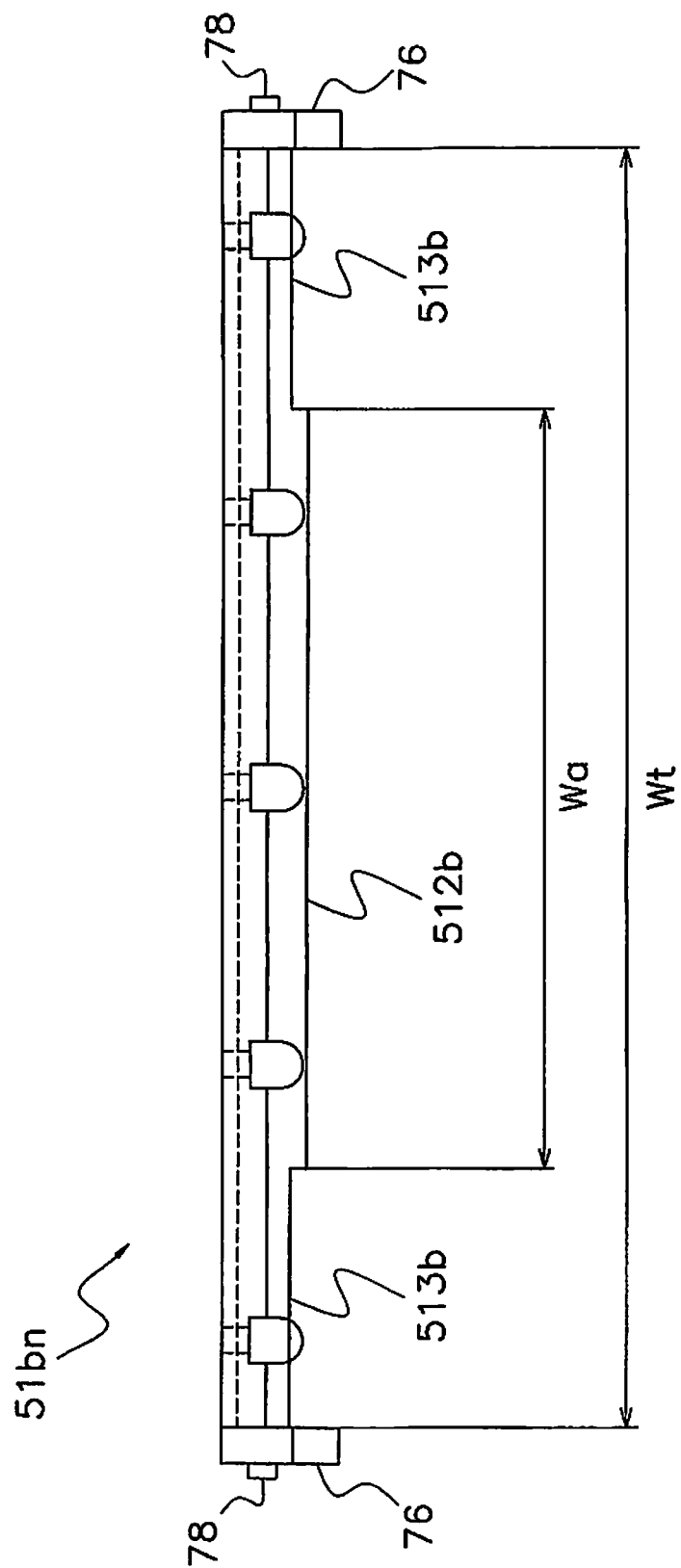
FIG. 8 is a plan view showing one example of an anvil component, used as the first anvil of FIG. 7, viewing from above, which shows a state in which a guide is attached to each of the both ends of the anvil component.

The guides 76 protrude further toward the first horn 51*a* side (toward the side of the first rotating body 50*a* supporting the first horn 51*a*) over the first anvil 51*b* in a state where the first horn 51*a* and the first anvil 51*b* sandwich the tubular film Fc (refer to FIGS. 5, 7, and 8). The guide spaces Sg formed in the guide 76 protrude toward the first horn 51*a* side (toward the side of the first rotating body 50*a* supporting the first horn 51*a*) than does the anvil-side knife movement space Sa formed in the first anvil 51*b* in a state where the first horn 51*a* and the first anvil 51*b* sandwich the tubular film Fc (refer to FIGS. 9(*a*) and 9(*b*)).

(2-1-5) Cutting Mechanism

A cutting mechanism 70 is provided to each of the first anvil 51*b* and the second anvil 52*b*. Each of the cutting mechanisms 70 primarily has a metal (e.g., stainless steel) knife 72 housed in the anvil-side knife movement spaces Sa of the anvils 51*b*, 52*b*, an air cylinder 75 as a knife-driving part for driving the knife 72, and two guides 76 provided to the left and right ends of the anvils 51*b*, 52*b*. Guide spaces Sg for guiding the movement of the knife 72 when the knife 72 is driven by the air cylinder 75 are formed in the guides 76.

The cutting mechanism 70 provided to the first anvil 51*b* and the cutting mechanism 70 provided to the second anvil 52*b* have the same configuration and function; therefore, the cutting mechanism 70 provided to the first anvil 51*b* will be described here but description pertaining to the cutting mechanism 70 provided to the second anvil 52*b* will be omitted.

The knife 72 of the cutting mechanism 70 provided to the first anvil 51*b* is housed in the anvil-side knife movement space Sa in the first anvil 51*b* while no operation for cutting the tubular film Fc is performed. The knife 72 is driven by the air cylinder 75 at a timing fitting to the timing when the tubular film Fc is transversely sealed. In other words, the knife 72 is driven by the air cylinder 75 at the timing when the first horn 51*a* and the first anvil 51*b* sandwich the tubular film Fc and are driven in the vertical direction. The knife 72 is driven by the air cylinder 75 so as to move in the anvil-side knife movement space Sa toward the first horn 51*a*, and furthermore to reach the horn-side knife movement space Sh formed in the first horn 51*a*. The knife 72 is disposed in the anvil-side knife movement space Sa such that the length direction of the knife 72 matches the transverse-seal direction (the left-right direction) of the first horn 51*a* and the first anvil 51*b*. The knife 72 is disposed such that a cutting edge of the knife 72 faces toward the first horn 51*a* in a state where the first horn 51*a* and the first anvil 51*b* sandwich the tubular film Fc. As described above, when the knife 72 is driven so that it passes through the anvil-side knife movement space Sa and reaches the horn-side knife movement space Sh, the sealed bag B is cut away from the tubular film Fc by the knife 72. The bag B separated from the tubular film Fc is discharged from the bottom part of the weighing/packaging apparatus 1. The knife 72, which has cut the sealed bag B away from the tubular film Fc and reached the horn-side knife movement space Sh, moves horizontally and returns to the anvil-side knife movement space Sa when control air is emitted from the air cylinder 75.

The anvil-side knife movement space Sa, the horn-side knife movement space Sh, and the guide spaces Sg will be described in detail.

Figure 9:
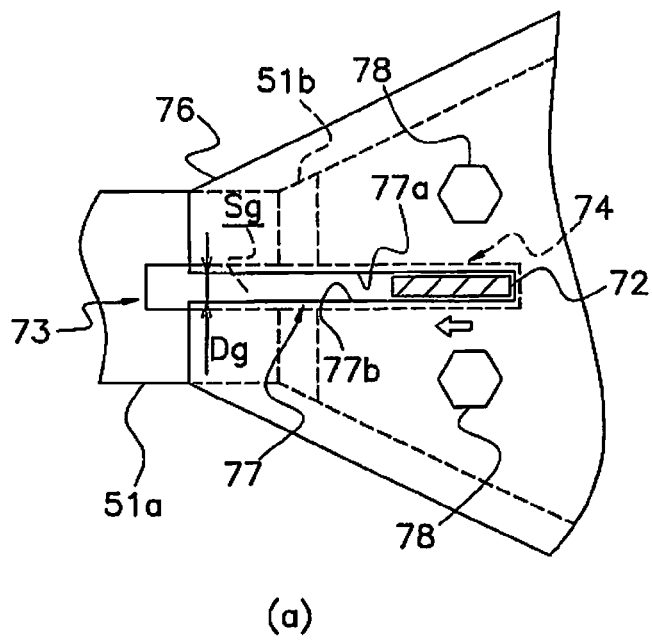
FIG. 9 is a schematic side view showing a first horn attached to the first rotating body and the first anvil attached to the second rotating body, viewing from a direction of arrow IX of FIG. 5, where
Figure 9:
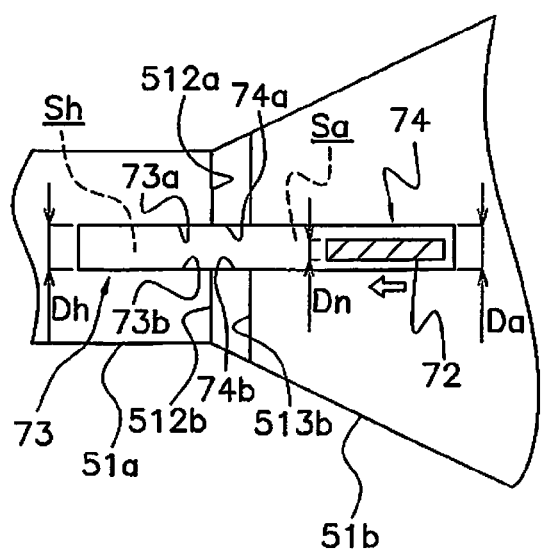

FIG. 9(*a*) is a view showing the first horn 51*a* and the first anvil 51*b* to which the guides 76 are attached, in a state where the seal surface 512*a* of the first horn 51*a* and the seal surface 512*b* of the first anvil 51*b* sandwich the tubular film Fc as shown in FIG. 5, from the direction of arrow IX in FIG. 5 (from the left side). In FIG. 9(*a*), portions that cannot be seen due to the presence of the guides 76 are indicated by dashed lines. FIG. 9(*b*) is a view showing the first horn 51*a* and the first anvil 51*b* from which the guides 76 are removed, in a state where the seal surface 512*a* of the first horn 51*a* and the seal surface 512*b* of the first anvil 51*b* sandwich the tubular film Fc as shown in FIG. 5, from the direction of arrow IX in FIG. 5. In FIGS. 5 and 9, the tubular film Fc is omitted.

The horn-side knife movement space Sh and the anvil-side knife movement space Sa will be described using FIG. 9(*b*). In a state where the first horn 51*a* and the first anvil 51*b* sandwich the tubular film Fc, the horn-side knife movement space Sh in the first horn 51*a* and the anvil-side knife movement space Sa communicate with each other, as shown in FIG. 9(*b*).

The width Dh of the horn-side knife movement space Sh and the width Da of the anvil-side knife movement space Sa are designed so as to be the same (refer to FIG. 9*b*)). In other words, with respect to a thickness direction of the knife 72, the width Dh of the horn-side knife movement space Sh and the width Da of the anvil-side knife movement space Sa are the same. In other words, the widths Dh of the horn-side knife movement space Sh and the widths Da of the anvil-side knife movement space Sa are the same with respect to the vertical direction, which is orthogonal to the movement direction of the knife 72 driven by the air cylinder 75 (the front-rear direction, in FIG. 9(*b*) leftward direction as shown by the arrow) and the length direction of the knife 72 (the left-right direction).

The upper surface 73*a* of the slot 73 that defines the upper edge of the horn-side knife movement space Sh in the first horn 51*a* and the upper surface 74*a* of the slot 74 that defines the upper edge of the anvil-side knife movement space Sa in the first anvil 51*b* are positioned at the same height in a state where the first horn 51*a* and the first anvil 51*b* sandwich the tubular film Fc. The lower surface 73*b* of the slot 73 that defines the lower edge of the horn-side knife movement space Sh in the first horn 51*a* and the lower surface 74*b* of the slot 74 that defines the lower edge of the anvil-side knife movement space Sa in the first anvil 51*b* are positioned at the same height in a state where the first horn 51*a* and the first anvil 51*b* sandwich the tubular film Fc. It should be understood from the drawings (for example, FIGS. 9(*a*) and 9(*b*)), that when the first horn 51*a* and the first anvil 51*b* are positioned to sandwich the tubular film Fc for sealing, the slot 73 and the slot 74 are aligned. Hence, the horn-side knife movement space Sh and the anvil-side knife movement space Sa are also aligned when the first horn 51*a* and the first anvil 51*b* are positioned to sandwich the tubular film Fc for sealing.

When the tubular film Fc is not sandwiched by the first horn 51*a* and the first anvil 51*b*, ultrasonic sealing is not performed even in a case when the oscillators 511 connected to the first horn 51*a* vibrate. Therefore, when the seal surface 512*a* of the first horn 51*a* and the seal surface 512*b* of the first anvil 51*b* sandwich the tubular film Fc, the tubular film Fc disposed at a portion in which the slot 73 of the first horn 51*a* and the slot 74 of the first anvil 51*b* face each other (not sandwiched by the seal surface 512*a* and the seal surface 512*b*) is not transversely sealed. In other words, the tubular film Fc disposed at a portion in which the slot 73 of the first horn 51*a* and the slot 74 of the first anvil 51*b* face each other does not contribute to sealing of the bag B. Therefore, in order to utilize the tubular film Fc as efficiently as possible, it is preferable to minimize the widths of the slot 73 of the first horn 51*a* and the slot 74 of the first anvil 51*b*, in other words, the width Da of the anvil-side knife movement space Sa and the width Dh of the horn-side knife movement space Sh, as much as possible. Therefore, it is preferable to minimize the thickness Dn of the knife 72 moving in the horn-side knife movement space Sh and the anvil-side knife movement space Sa as much as possible. For example, in the present embodiment, the thickness Dn of the knife 72 is 1.2 mm, and the width Dh of the horn-side knife movement space Sh and the width Da of the anvil-side knife movement space Sa are 2.0 mm. The above values are given as examples, but the present invention is not limited to this configuration. However, it is preferable that the thickness Dn of the knife 72 is equal to or less than 1.2 mm.

The guide spaces Sg will be described using FIG. 9(*a*). When viewed from the direction of arrow IX in FIG. 5 (from the left), the guide spaces Sg are disposed so as to be contained within a section of the width Da of the anvil-side knife movement space Sa with respect to the vertical direction (refer to FIG. 9(*a*)). In other words, the upper surfaces 77*a* of the guide slots 77 defining the upper edges of the guide spaces Sg are arranged below the upper surface 74*a* of the slot 74 defining the upper edge of the anvil-side knife movement space Sa when the first horn 51*a* and the first anvil 51*b* transversely seal the tubular film Fc (refer to FIG. 9(*a*)). The lower surfaces 77*b* of the guide slots 77 defining the lower edges of the guide spaces Sg are arranged above the lower surface 74*b* of the slot 74 defining the lower edge of the anvil-side knife movement space Sb when the first horn 51*a* and the first anvil 51*b* transversely seal the tubular film Fc (refer to FIG. 9(*a*)). The width Dg of the guide spaces Sg (the width in the vertical direction, which is orthogonal to both the movement direction of the knife 72 driven by the air cylinder 75 (front-rear direction, in FIG. 9(*a*) leftward as shown by the arrow) and the length direction of the knife 72 (the left-right direction)) is less than the width Da of the anvil-side knife movement space Sa. For example, the width Da of the anvil-side knife movement space Sa is 2.0 mm, and the width Dg of the guide spaces Sg is 1.6 mm. The above values are given as examples, but the present invention is not limited to this configuration; the width Dg of the guide spaces Sg may be greater than the thickness Dn of the knife 72 and less than the width Da of the anvil-side knife movement space Sa. Setting the guide spaces Sg and the anvil-side knife movement space Sa in the relationship described above causes the knife 72 to more readily come into contact with the guides 76 before coming into contact with the first anvil 51*b*, even when the first anvil 51*b* is driven so as to revolve and the knife bends and deforms in the vertical direction. In other words, the guides 76 prevent the knife 72 from coming into contact with the first anvil 51*b* directly during ultrasonic sealing, and a reduction in the service life of the transverse sealing mechanism 17 is suppressed. After the attachment positions are adjusted with respect to the first anvil 51*b* such that the positional relationship between the guide spaces Sg and the anvil-side knife movement space Sa is as described above, the guides 76 are secured to the first anvil 51*b* by bolts 78.

When viewed from the direction of arrow IX in FIG. 5, i.e., from the left side, the guide spaces Sg extend further toward the first horn 51*a* side than does the anvil-side knife movement space Sa, and a portion of the guide spaces Sg is disposed so as to overlap the horn-side knife movement space Sh. The guide spaces Sg extending further toward the first horn 51*a* side than does the anvil-side knife movement space Sa makes it possible for the guide spaces Sg to guide the movement of the knife 72 even when the knife 72 moves through the horn-side knife movement space Sh. When viewed from the direction of arrow IX in FIG. 5, the guide spaces Sg are disposed so as to fit within a section of the width Dh of the horn-side knife movement space Sh with respect to the vertical direction (refer to FIG. 9(*a*)). In other words, the upper surfaces 77*a* of the guide slots 77 defining the upper edges of the guide spaces Sg are arranged below the upper surface 73*a* of the slot 73 defining the upper edge of the horn-side knife movement space Sh when the first horn 51*a* and the first anvil 51*b* transversely seal the tubular film Fc (refer to FIG. 9(*a*)). The lower surfaces 77*b* of the guide slots 77 defining the lower edges of the guide spaces Sg are arranged above the lower surface 73*b* of the slot 73 defining the lower edge of the horn-side knife movement space Sh when the first horn 51*a* and the first anvil 51*b* transversely seal the tubular film Fc (refer to FIG. 9(*a*)). The width Dg of the guide spaces Sg (the width in the vertical direction, which is orthogonal to both the movement direction of the knife 72 driven by the air cylinder 75 (front-rear direction, leftward as shown by the arrow in FIG. 9(*a*)) and the length direction of the knife 72 (the left-right direction)) is less than the width Dh of the horn-side knife movement space Sh. Setting the guide spaces Sg and the horn-side knife movement space Sh in the relationship described above causes the knife 72 to more readily come into contact with the guides 76 before coming into contact with the first horn 51*a*, even when the first anvil 51*b* is driven so as to revolve and the knife bends and deforms in the vertical direction. In other words, the guides 76 prevent the knife 72 from coming into contact with the first horn 51*a* directly during ultrasonic sealing, and a reduction in the service life of the transverse sealing mechanism 17 is suppressed.

(2-2) Film-Supplying Unit

The film-supplying unit 3*b* supplies the sheet-shaped film F to the forming mechanism 13 of the bag making and packaging unit 3*a*. The film-supplying unit 3*b* is provided adjacent to the bag making and packaging unit 3*a*. A roll on which the film F is wound is set in the film-supplying unit 3*b*, and the film F is sent out from the roll.

(3) Features

Features of the bag making and packaging machine 3 according to the present embodiment will be described below.

Here, the features of the bag making and packaging machine 3 are described using the first horn 51*a*, the first anvil 51*b*, and the cutting mechanism 70 provided to the first anvil 51*b*; however, the features of the bag making and packaging machine 3 can be described in the same manner using the second horn 52*a*, the second anvil 52*b*, and the cutting mechanism 70 provided to the second anvil 52*b*. In other words, in the description below, the first horn 51*a* and the first anvil 51*b* can be read, respectively, as the second horn 52*a* and the second anvil 52*b*.

(3-1)

The bag making and packaging machine 3 according to the present embodiment, sandwiches a tube-shaped film (a tubular film Fc) transported in a first direction (downward in the present embodiment) between the first horn 51*a* and the first anvil 51*b* for ultrasonic sealing and transversely seals the tubular film Fc along a direction (a left-right direction in the present embodiment) intersecting the first direction. The bag making and packaging machine 3 is provided with the knife 72, the air cylinder 75 as a knife-driving part, and guides 76 as guide parts. The knife 72 is disposed in the anvil-side knife movement space Sa formed in the first anvil 51*b*. The air cylinder 75 drives the knife 72 disposed in the anvil-side knife movement space Sa, such that the knife 72 moves toward the first horn 51*a* when the tubular film Fc is transversely sealed so that a sealed bag B is cut and separated from the tubular film Fc. The guides 76 are provided on each of the both ends of the first anvil 51b. On the guides 76, guide spaces Sg, by which movement of the knife 72 is guided when the knife 72 is driven by the air cylinder 75, are formed. The width Dg of the guide spaces Sg with respect to a second direction (an vertical direction in the present embodiment), which is orthogonal to both the movement direction of the knife 72 driven by the air cylinder 75 (a front-rear direction in the present embodiment) and the length direction of the knife 72 (the left-right direction in the present embodiment), is less than the width Da of the anvil-side knife movement space Sa with respect to the second direction.

Here, guide spaces Sg for guiding the movement of the knife 72 are formed in guides 76 provided on each of the both ends of a first anvil 51b, and the width Dg of the guide spaces Sg with respect to the vertical direction (a direction orthogonal to both the movement direction of the knife 72 driven by the air cylinder 75 and the length direction of the knife 72) is less than the width Da of the an anvil-side knife movement space Sa with respect to the same direction. Therefore, the knife 72 comes into contact with the guides 76 before coming into contact with the first anvil 51b or any other member, even if the knife 72 should bend in the vertical direction for any reason. As a result, since the knife 72 is prevented from coming into contact with the first anvil 51b or other members during transverse sealing, reduction in the service life of the transverse sealing mechanism 17 used as an ultrasonic unit and other such circumstances can be easily suppressed.

(3-2)

In the bag making and packaging machine 3 according to the present embodiment, the guides 76 are non-metal members that are separate from the first anvil 51b.

In the present embodiment, because the guides 76 are non-metal members that are separate from the metal first anvil 51b, it is possible to suppress wear of the knife 72 due to contact between the knife 72 and the guides 76.

(3-3)

In the bag making and packaging machine 3 according to the present embodiment, the guides 76 are secured to the first anvil 51b by bolts 78 used as fastening members after the attaching positions of the guides 76 to the first anvil 51b are adjusted.

In the present embodiment, because the guides 76 are secured to the first anvil 51b, it is possible to adjust the attachment positions of the guides 76 with respect to the first anvil 51b (the anvil components 51b1, 51b2, . . . 51bn) removed from the bag making and packaging machine 3. Therefore, the guides 76 are easily disposed in suitable positions with respect to the first anvil 51b.

(3-4)

In the bag making and packaging machine 3 according to the present embodiment, the first horn 51a and the first anvil 51b are respectively driven to revolve so that the tubular film Fc transported in the first direction (downward in the present embodiment) is sandwiched and transversely sealed.

In the present embodiment, by driving the first horn 51a and the first anvil 51b so as to revolve, it is possible to efficiently perform transverse sealing on the tubular film Fc. When the first anvil 51b is driven so as to revolve, the knife 72 disposed in the anvil-side knife movement space Sa formed in the first anvil 51b readily bends due to the effects of rotary inertia. However, because the guides 76 are provided, the knife 72 is prevented from coming into contact with the first anvil 51b or other members. Therefore, it is possible to prevent a reduction in the service life of the transverse sealing mechanism 17 used as an ultrasonic unit and other such circumstances.

(3-5)

In the bag making and packaging machine 3 according to the present embodiment, the guide spaces Sg extend further toward the first horn 51a side beyond the anvil-side knife movement space Sa in a state in which the first horn 51a and the first anvil 51b sandwich the tubular film Fc therebetween.

In the present embodiment, even when the knife 72 moves beyond the anvil-side knife movement space Sa formed in the first anvil 51b and moves through a horn-side knife movement space Sh formed in the first horn 51a, the movement of the knife 72 is readily guided by the guide spaces Sg. Therefore, the knife 72 is easily prevented from coming into contact with the first horn 51a, and it is easy to suppress a reduction in the service life of the transverse sealing mechanism 17 used as an ultrasonic unit and other such circumstances.

(3-6)

In the bag making and packaging machine 3 according to the present embodiment, the thickness of the knife 72 is 1.2 mm.

In the present embodiment, by reducing the thickness of the knife 72 to 1.2 mm or less, it is possible to utilize the film F efficiently without waste. Reduction of the thickness of the knife 72 allows the knife 72 to readily bend, however, due to the presence of the guides 76, the knife 72 is prevented from coming into contact with the first anvil 51b or other members. As a result, the knife 72 is prevented from coming into contact with the first anvil 51b or other members during transverse sealing, and a reduction in the service life of the transverse sealing mechanism 17 used as an ultrasonic unit and other such circumstances are easily prevented from occurring.

(4) Modification Examples

Modification examples of the present embodiment are given below. A plurality of modification examples may be suitably combined, provided that such modification examples are consistent with each other.

(4-1) Modification Example A

In the transverse sealing mechanism 17 according to the embodiment described above, the horns 51a, 52a and the anvils 51b, 52b are driven so as to revolve in D-shaped tracks so that the tubular film Fc is sandwiched between the first horn 51a and the first anvil 51b, or between the second horn 52a and the second anvil 52b, and is transversely sealed, but the present invention is not limited to this configuration.

For example, the transverse sealing mechanism may be configured such that at least one of the horn and the anvil performs linear reciprocating motion toward the other member so that the tubular film Fc transported in the first direction is sandwiched between the horn and the anvil and is transversely sealed along a direction intersecting the first direction.

(4-2) Modification Example B

In the transverse sealing mechanism 17 according to the embodiment described above, the first horn 51a and the second anvil 52b are provided to the first rotating body 50a, and the first anvil 51b and the second horn 52a are provided to the second rotating body 50b. The first horn 51a and first anvil 51b and the second horn 52a and second anvil 52b alternatingly sandwich and transversely seal the tubular film Fc, but the present invention is not limited to this configuration.

For example, in the bag making and packaging machine 3, a configuration may be adopted in which the first rotating body 50a is provided with only the first horn 51a, the second rotating body 50b is provided with only the first anvil 51b, and only the first horn 51a and the first anvil 51b are used to perform transverse sealing. In another example, the bag making and packaging machine 3 may be configured so as to have three or more groups of horns and anvils, these groups being used in turn to transversely seal the tubular film Fc.

(4-3) Modification Example C

In the cutting mechanism 70 according to the embodiment described above, the knife 72 is driven by the air cylinder 75, but the present invention is not limited to this configuration. The knife 72 may be driven by a motor and/or a hydraulic machine or the like.

(4-4) Modification Example D

The guides 76 according to the embodiment described above are non-metal members (e.g., resin members), but the present invention is not limited to this configuration; the guides 76 may be metal members. However, when the guides 76 are metal members, wear or the like could occur when the metal knife 72 comes into contact with the guides 76; therefore, the guides 76 are preferably non-metal members made of resin or the like.

(4-5) Modification Example E

The guides 76 according to the embodiment described above are separate from the anvils 51b, 52b, but the present invention is not limited to this configuration. For example, a configuration may be adopted in which integrally formed portions that do not come into contact with the horns 51a, 52a are provided to the left and right ends of each of the metal anvils 51b, 52b are utilized as guide parts. Furthermore, the guide parts may be covered by a resin so as to suppress wear of the knife 72 during contact.

(4-6) Modification Example F

In the bag making and packaging machine 3 according to the embodiment described above, the guide spaces Sg in the guides 76 provided to the first anvil 51b protrude further toward the first horn 51a side than does the anvil-side knife movement space Sa in the first anvil 51b in a state in which the first horn 51a and the first anvil 51b sandwich the tubular film Fc therebetween, but the present invention is not limited to this configuration. For example, even in cases where the guide spaces Sg in the guides 76 provided to the first anvil 51b do not protrude further toward the first horn 51a side than does the anvil-side knife movement space Sa formed in the first anvil 51b, contact between the knife 72 and the first horn 51a will be inhibited when a portion of the knife 72 is guided by the guide spaces Sg while the knife 72 is moving through the horn-side knife movement space Sh in the first horn 51a. However, it is easier to inhibit contact between the knife 72 and the first horn 51a when the guide spaces Sg in the guides 76 provided to the first anvil 51b extend further toward the first horn 51a side than does the anvil-side knife movement space Sa in the first anvil 51b in a state in which the first horn 51a and the first anvil 51b sandwich the tubular film Fc therebetween.

The same applies to the guide spaces Sg in the guides 76 provided to the second anvil 52b.

INDUSTRIAL APPLICABILITY

In the bag making and packaging machine according to the present invention, when the knife disposed in the space formed in the anvil is moved toward the horn and a sealed bag is cut away from a tubular film during ultrasonic transverse sealing, it is possible to prevent the knife from coming into contact with the anvil or other members, and to prevent reduction in the service life of the ultrasonic unit and other such circumstances from occurring. The bag making and packaging machine according to the present invention therefore has utility.

What is claimed is:

1. A bag making and packaging machine, comprising
   a transverse sealing mechanism having a horn and an anvil that are configured to sandwich a tube-shaped film transported in a first direction between the horn and the anvil for ultrasonic sealing, and configured to transversely seal along a direction intersecting the first direction, the anvil being formed with a knife movement space;
   a knife disposed in the knife movement space formed in the anvil;
   a knife-driving part coupled to the transverse sealing mechanism and configured to drive the knife within the knife movement space such that the knife moves toward the horn when the film is transversely sealed so that a sealed bag is cut and separated from the tube-shaped film; and
   a guide part provided at each end of the anvil, each of the guide parts defining a respective guide space therein such that movement of the knife is guided along the guide spaces when the knife is driven by the knife-driving part,
   wherein
   each of the guide spaces has a first width measured with respect to a second direction, which is orthogonal to a movement direction of the knife driven by the knife-driving part and orthogonal to a length direction of the knife, and the knife movement space defines a second width measured with respect to the second direction, the first width being less than the second width.

2. The bag making and packaging machine according to claim 1, wherein
   the guide part is a non-metal member that is separate from the anvil.

3. The bag making and packaging machine according to claim 2, wherein
   the guide part is secured to the anvil by a fastening member after the attaching position of the guide part to the anvil such that positioning of the guide part is adjustable relative to the anvil.

4. The bag making and packaging machine according to claim 1, wherein
   the horn and the anvil are respectively configured to be driven to revolve so that the tube-shaped film transported in the first direction is sandwiched and transversely sealed.

5. The bag making and packaging machine according to claim 1, wherein
   the guide spaces extend further toward the horn side beyond the knife movement space in a state in which the horn and the anvil sandwich the tube-shaped film therebetween.

6. The bag making and packaging machine according to claim 1, wherein
   a thickness of the knife is no more than 1.2 mm.

* * * * *